US010757163B2

(12) United States Patent
Marquess et al.

(10) Patent No.: US 10,757,163 B2
(45) Date of Patent: Aug. 25, 2020

(54) PERSISTING USER PREFERENCES IN AN INTERMEDIATE NETWORK DEVICE

(71) Applicant: Openwave Mobility Inc., Redwood City, CA (US)

(72) Inventors: Paul Marquess, Belfast (GB); Stephen Wright, Belfast (GB); Colin Woods, Belfast (GB)

(73) Assignee: Openwave Mobility Inc., Redwood City, CA (US)

( * ) Notice: Subject to any disclaimer, the term of this patent is extended or adjusted under 35 U.S.C. 154(b) by 1418 days.

(21) Appl. No.: 14/141,596

(22) Filed: Dec. 27, 2013

(65) Prior Publication Data

US 2014/0108521 A1 Apr. 17, 2014

Related U.S. Application Data

(63) Continuation of application No. PCT/EP2012/062852, filed on Jul. 2, 2012.

(60) Provisional application No. 61/503,081, filed on Jun. 30, 2011.

(51) Int. Cl.
*H04L 29/08* (2006.01)

(52) U.S. Cl.
CPC .......... *H04L 67/02* (2013.01); *H04L 67/2823* (2013.01); *H04L 67/306* (2013.01); *H04L 67/303* (2013.01)

(58) Field of Classification Search
CPC ....... H04L 76/306; H04L 76/02; H04L 76/22; H04L 76/2823; H04L 63/102; H04L 51/063; H04L 65/601; H04L 67/02; H04L 67/2823; H04W 8/18
See application file for complete search history.

(56) References Cited

U.S. PATENT DOCUMENTS

| 5,148,481 | A | * | 9/1992 | Abraham | G06F 12/121 |
| | | | | | 331/78 |
| 6,993,590 | B1 | | 1/2006 | Gauthier et al. | |
| 7,401,115 | B1 | * | 7/2008 | Arsenault | H04L 67/2814 |
| | | | | | 370/352 |
| 7,716,380 | B1 | * | 5/2010 | Wang | H04L 67/14 |
| | | | | | 370/452 |
| 2003/0105805 | A1 | * | 6/2003 | Jorgenson | H04L 29/06 |
| | | | | | 709/203 |
| 2005/0027882 | A1 | * | 2/2005 | Sullivan | H04L 29/12066 |
| | | | | | 709/244 |
| 2008/0039102 | A1 | * | 2/2008 | Sewall | H04L 12/2856 |
| | | | | | 455/445 |
| 2008/0114771 | A1 | * | 5/2008 | Welingkar | H04L 41/0846 |

(Continued)

FOREIGN PATENT DOCUMENTS

WO 0111821 A1 2/2001

OTHER PUBLICATIONS

International Search Report issued for application PCT/EP2012/062852, dated Mar. 11, 2013.

*Primary Examiner* — Jason D Recek
(74) *Attorney, Agent, or Firm* — EIP US LLP

(57) ABSTRACT

A network device transparently intercepts HTTP transmissions between a user device and a web server. The network device stores user preference information, which allows the intermediate network device to apply the user preference information to retrieved content that is directed to the user's mobile device.

18 Claims, 7 Drawing Sheets

(56) References Cited

U.S. PATENT DOCUMENTS

| | | | | |
|---|---|---|---|---|
| 2009/0085803 | A1* | 4/2009 | Mergen | G01C 21/20 |
| | | | | 342/357.75 |
| 2010/0211636 | A1* | 8/2010 | Starkenburg | H04N 7/17318 |
| | | | | 709/203 |
| 2010/0214600 | A1* | 8/2010 | Yagi | G06F 21/34 |
| | | | | 358/1.15 |
| 2011/0047031 | A1* | 2/2011 | Weerasinghe | G06Q 30/02 |
| | | | | 705/14.66 |
| 2012/0166627 | A1* | 6/2012 | Kraiman | H04L 43/12 |
| | | | | 709/224 |

* cited by examiner

PERSISTING USER PREFERENCES IN AN INTERMEDIATE NETWORK DEVICE

CROSS-REFERENCE TO RELATED APPLICATIONS

This application is a continuation under 35 U.S.C. § 120 of International Application No. PCT/EP2012/062852, filed Jul. 2, 2012 (and published in the English language as WO 2013/001099), which claims the benefit of U.S. Provisional Patent Application No. 61/503,081, filed Jun. 30, 2011. The entire contents of the above-referenced patent applications are hereby incorporated by reference.

BACKGROUND OF THE INVENTION

Field of the Invention

This application relates to a method and apparatus for operating an intermediary server.

Description of the Related Technology

Persistence of user preferences for web optimization of mobile devices is often accomplished using a database which correlates specific users with one or more specific preferences. When users are anonymous, as with pay-as-you-go mobile telephones, databases do not store the anonymous user's settings. In the case of anonymous users, the only identifying information typically available is an internet protocol (IP) address of the mobile device. However, such IP addresses of mobile devices for anonymous users do not remain constant over time. So, including preferences stored for a particular IP address in a database would result in confusion as an anonymous user's IP address changes and, consequently, the anonymous user's preferences might be applied to a subsequent user's mobile device that later acquires the same IP address.

SUMMARY

A network device transparently intercepts HTTP transmissions between a user device and a web server. The network device stores user preference information, which allows the intermediate network device to apply the user preference information to retrieved content that is directed to the user's mobile device. In the case of an anonymous user, the user preferences can be applied to the content, without requiring that the user preference information be stored in a dedicated user preference database configured for known users.

BRIEF DESCRIPTION OF THE DRAWINGS

Throughout the description, similar reference numbers may be used to identify similar elements.

DETAILED DESCRIPTION OF CERTAIN INVENTIVE EMBODIMENTS

Figure 1:
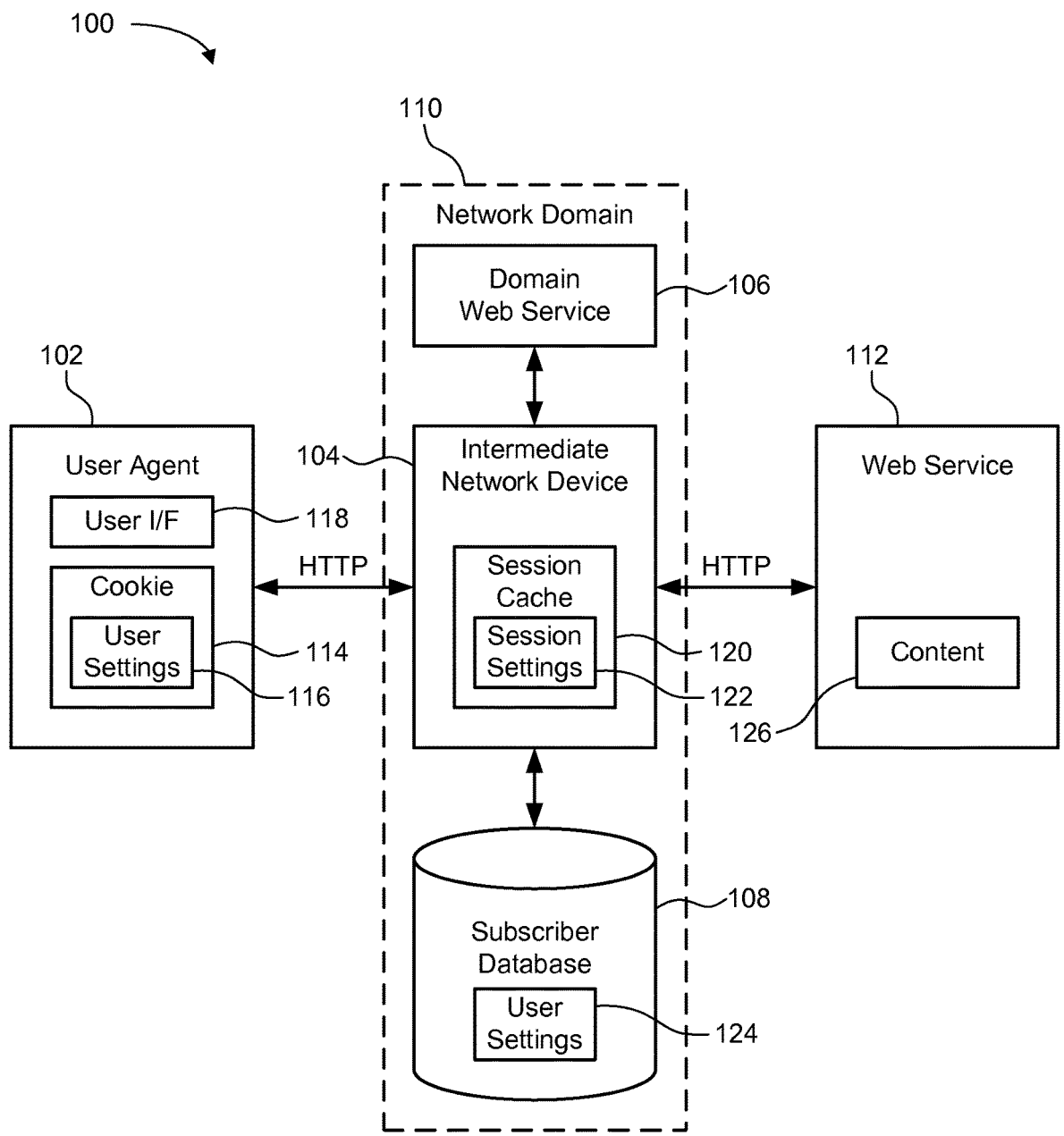
FIG. 1 depicts a schematic block diagram of one embodiment of a network system for implementation of user preferences during web content retrieval.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Certain inventive aspects disclosed herein may be embodied in other specific forms without departing from its spirit or essential characteristics. The disclosed embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized in the disclosed embodiments should be or are in any single embodiment of the application. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the inventions disclosed herein may be combined in any suitable manner in one or more embodiments. One skilled in the relevant art will recognize, in light of the description herein, that the aspects of the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate storing user preference information on an intermediate network device (e.g., a HTTP Proxy) between an end consumer (e.g., a User Agent) and a content provider (e.g., a Web Service). The network device intercepts traffic (e.g., HTTP traffic) as it passes between the end consumer and the content provider to apply the user preference information to the retrieved content before it is transmitted to the end consumer.

Conventionally, user preference information is stored at the end user's device, for example, in the form of a cookie. When a user's device submits a request for data from a web service, the device sends any applicable cookies to the web service, so that information in the cookies (e.g., user profile) might be used by the web service to fulfill the request. However, cookies are domain-specific, which means that cookies which are associated with a specific web service domain are not used for other web service domains. Consequently, the conventional use of cookies does not allow user preferences specified for one domain to be applied to other domains. Also, while cookies are conventionally transmitted through intermediate network devices, the intermediate network devices do not typically store cookie information (other than for retransmission purposed) and, moreover, do not modify content based on user preferences specified in the transmitted cookies.

While many embodiments described herein refer to using data structures designated as cookies, the specific name designation of the data structures is not intended to limit the type of data structures that might be used to store and communicate user preference information between network devices. In some embodiment, though, the data structures are domain-specific so that each data structure only corresponds to a single network or web service domain.

In some embodiments described herein, an independent web service domain—separate from the requested web service domain—is available to set up one or more cookies on the user's device. The user preference information from those cookies is also stored at the intermediate network device, and the intermediate network device can use the stored user preference information to modify content retrieved from other web service providers before the retrieved content is sent to the user's device. In this way, the intermediate network device facilitates global user preference information stored on the intermediate network device in a way that is not possible otherwise using cookies in the conventional manner.

Accordingly, embodiments described herein facilitate persisting state information that is specific to a user agent on a particular device, and that information can be made available to the network device/proxy so that the network device/proxy can influence HTTP traffic to and from the user agent. Examples of different types of user preference information that might be specified and applied to the HTTP traffic include, but are not limited to, content filtering, web optimization, advertising preferences, language settings, and other end-user preferences. Various features and implementation details of possible embodiments are described in more detail below with reference to the figures.

FIG. 1 depicts a schematic block diagram of one embodiment of a network system 100 for implementation of user preferences during web content retrieval. In general, the network system 100 facilitates retrieval of web service content. Although the network system 100 is shown and described with certain components and functionality, other embodiments of the network system 100 may include fewer or more components to implement less or more functionality.

The illustrated network system 100 includes a user agent 102 and an intermediate network device 104. The intermediate network device 104 along with a domain web service 106 and, optionally, a subscriber database 108 are part of a network domain 110. The network system 100 also includes a web service 112.

The illustrated user agent 102 includes a cookie 114 which stores user settings 116 (also referred to herein as user preference information). In one embodiment, the user agent 102 stores at least one cookie 114 for each website from which information is retrieved. Alternatively, if a particular web service 112 does not use cookies, then the user agent 102 may include at least one cookie for each website which uses cookies and from which information is retrieved.

The user agent 102 also includes a user interface (I/F) 118. The user interface 118 may be any type of interface which allows a user to interact with, provide input to, and/or receive output from the user agent 102. Some examples of user interface 118 devices include key pads, touch screens, audio microphones, indicator lights, and so forth. Various types of user interface devices 118, either separately or in combination, are contemplated for implementation with the user agent 102.

In the depicted embodiment, the intermediate network device 104 of the network domain 110 communicates with the user agent 102 and the web service 112 using data communications that are compliant with typical HTTP protocols, or other similar or equivalent data communication protocols. Embodiments described herein are not limited to a particular data communication protocol. The intermediate network device 104 also may use similar or other communication protocols to communicate with and transmit data with the domain web service 106 and the subscriber database 108 of the network domain 110.

In the illustrated embodiment, the subscriber database 108 stores user settings 124 for some users of a carrier network. Although shown in FIG. 1 as part of the network domain 110, in other embodiments, the subscriber database 108 is located remotely from the network domain and may be accessed, for example, via other network equipment maintained by another entity such as the carrier.

While some of the user settings 124 may be stored in the subscriber database 108, other user settings are not easily or effectively stored in the subscriber database 108. For example, user settings correspond to devices for which no user account exists (e.g., for an anonymous user), it may be difficult or impossible to effectively store user preference information in the subscriber database 108, because anonymous user devices may only be identified by a temporary IP address.

Accordingly, in some embodiments, the intermediate network device 104 includes a session cache 120 to store session settings that include one or more user settings corresponding to a particular user agent 102. In general, the intermediate network device 104 may control the process for storing the user settings within the session settings 122 of the session cache 120 by redirecting web requests to the domain web service 106. In one embodiment, the domain web service 106 is specifically configured (and potentially dedicated) to initiating generation of a new cookie 114 at the user agent 102 which is then stored (or at least some of the contents are stored) as the session settings 122 in the session cache 120. Alternatively, some, but not all, of the contents of the cookie 114 associated with the domain web service 106 are stored as the session settings 122 in the session cache 120.

Thus, in some embodiments, the intermediate network device 104 manages processes to generate the new cookie 114 associated with the domain web service 106, store user preference information from the new cookie 114 in the session cache 120, and associate the stored user preference information with a specific user agent 102. The intermediate network device 104 also manages processes to retrieve content 126 from a different web service 112 (as requested by the user agent 102), modify the retrieved content according to the user preference information stored at the intermediate network device 104, and then send the modified content to the user agent 102.

Figure 2:
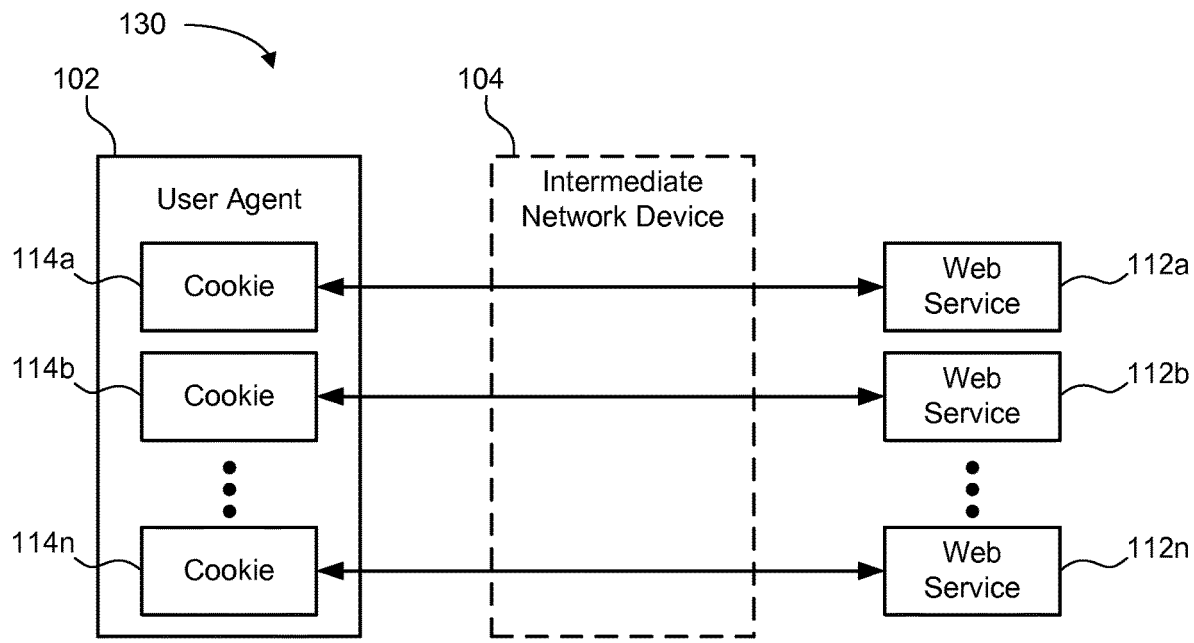
FIG. 2 depicts a schematic block diagram of one embodiment of a process for providing transparent web services within the network system of FIG. 1.

FIG. 2 depicts a schematic block diagram of one embodiment of a process 130 for providing transparent web services 112a-n within the network system 100 of FIG. 1. When a user agent 102 already has cookies 114a-n which correspond to various web services 112a-n, the intermediate network device 104 can provide essentially transparent performance to allow the user agent 102 to access the content from the various web services 112a-n. Each cookie 114a-n can persist at the user agent 102 over a single HTTP session or over multiple HTTP sessions.

In this embodiment, there is no need for the intermediate network device 104 to perform additional modifications for the content 126 that is retrieved from the various web services 112a-n. Rather, the intermediate network device 104 can simply perform conventional network transmission processing operations to facilitate the data transfer between the user agent 102 and the web services 112a-n. However, in some embodiments, the intermediate network device 104 additionally may perform at least some modifications on the content 126 retrieved from one or more web services 112a-n, based on session settings 122 stored at the intermediate network device 104, as described below.

Figure 3:
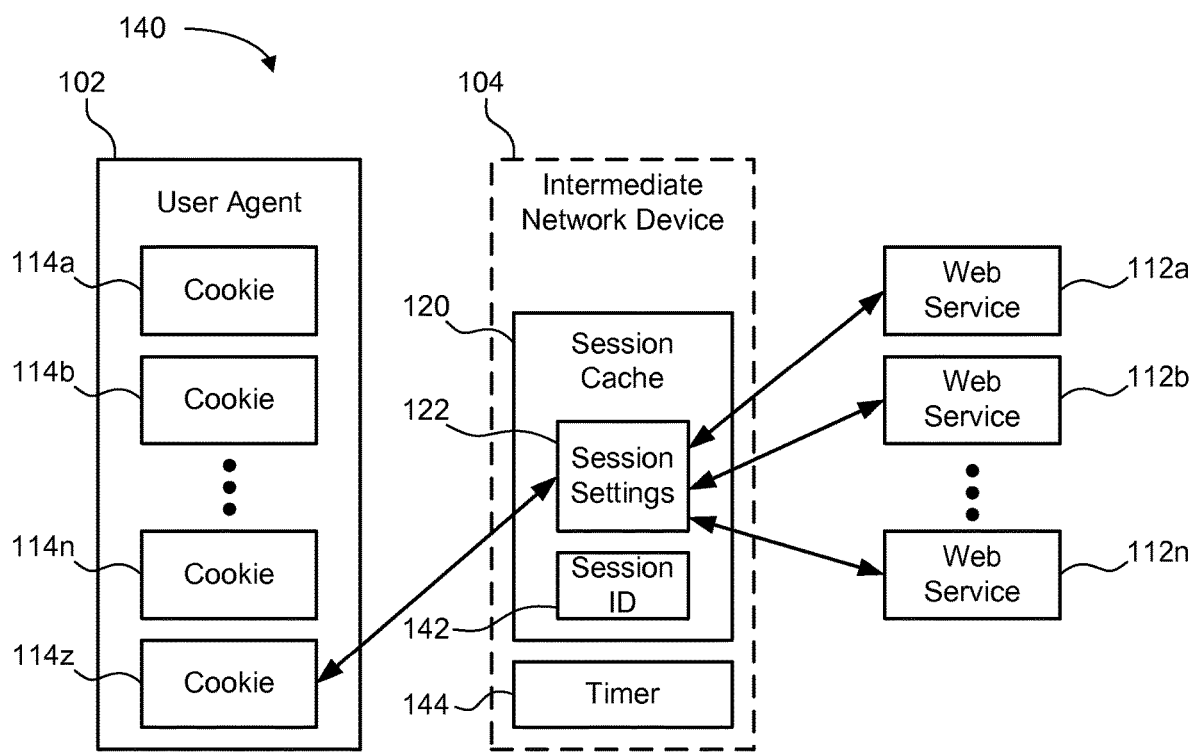
FIG. 3 depicts a schematic block diagram of one embodiment of a process for providing content modification at the intermediate network device of the network system of FIG. 1.

FIG. 3 depicts a schematic block diagram of one embodiment of a process 140 for providing content modification at the intermediate network device 104 of the network system 100 of FIG. 1. In the illustrated embodiment, the user agent 102 may maintain the same cookies 114a-n as before corresponding to the various web services 112a-n, as described above. Alternatively, the user agent 102 may not maintain separate cookies 114a-n corresponding to each of the web services 112a-n.

Regardless of whether or not other cookies 114a-n might be available at the user agent 102, the user agent 102 stores another cookie 114z which is specifically associated with the domain web service 106 corresponding to the network domain 110 (see FIG. 1). For convenience, this specific cookie 114z corresponding to the network domain 110 is also referred to herein as the network domain cookie 114z. Although only a single network domain cookie 114z is shown, other embodiments may utilize more than one network domain cookie 114z.

Some or all of the user preference information from the network domain cookie 114z is also stored at the intermediate network device 104. In one embodiment, the session settings 122 stored on the session cache 120 include some or all of the user preference information from the network domain cookie 114z. The session cache 120 also stores a session ID 142 corresponding to the user agent 102. Some examples of different types of session IDs 142 may include, but are not limited to, the IP address assigned to the user agent 102, the telephone number associated with the user agent 102, or an identifier associated with a particular subscriber. By associating a session ID 142 and session settings 122 for the user agent 102 within the intermediate network device 104, the intermediate network device 104 may be able to simultaneously store numerous session settings 122 for many different user agents 102 that have or are communicating via the intermediate network device 104 with the same or different web services 112a-n.

The session cache 120 may be a short-lived cache that is stored in-memory. When a user agent 102 establishes a session, the state information may be read from a network domain cookie 114z and then stored in the session cache 120. In some embodiments, subsequent HTTP request from the user agent 102 during that browsing session will use the state information stored in the session cache 120 to modify data that is retrieved and directed to the user agent 102.

In some embodiments, the session settings 122 for a particular user agent 102 are deleted after a period of inactivity. The period of inactivity may be monitored by a timer 144 or other activity monitoring device or application. The period of inactivity may correspond with the term of an IP address allocated to the user agent 102.

Also, in some embodiments, the identifier used to identify the user agent 102 at the intermediate network device 104 may remain constant for only a relatively short period of time. Thus, the session cache 120 may include garbage collection functionality (not shown) to proactively manage the session cache 120.

In some embodiments, the session settings 122 for a particular user agent 102 may be used for all communications from two or more web services 112a-n. As a specific example, the session settings 122 may specify user preference information that identifies a type of mobile device, or display capabilities of a mobile device, so that the intermediate network device 104 may modify content 126 retrieved from the various web services 112a-n to more closely match the specific display capabilities of the mobile device. In this example, the content 126 that is retrieved by the intermediate network device 104 from any and all web services 112a-n can be modified according to the same session settings 122 that are stored at the session cache 120. As another example, if the session settings 122 specify a particular user language and the intermediate network device 104 is capable of facilitating content translations, then the content 126 from different web services 112a-n may be presented to the user agent 102 in a single language, regardless of the source language(s) of the content at the web services 112a-n. Other embodiments may modify retrieved content 126 in other ways.

Figure 4:
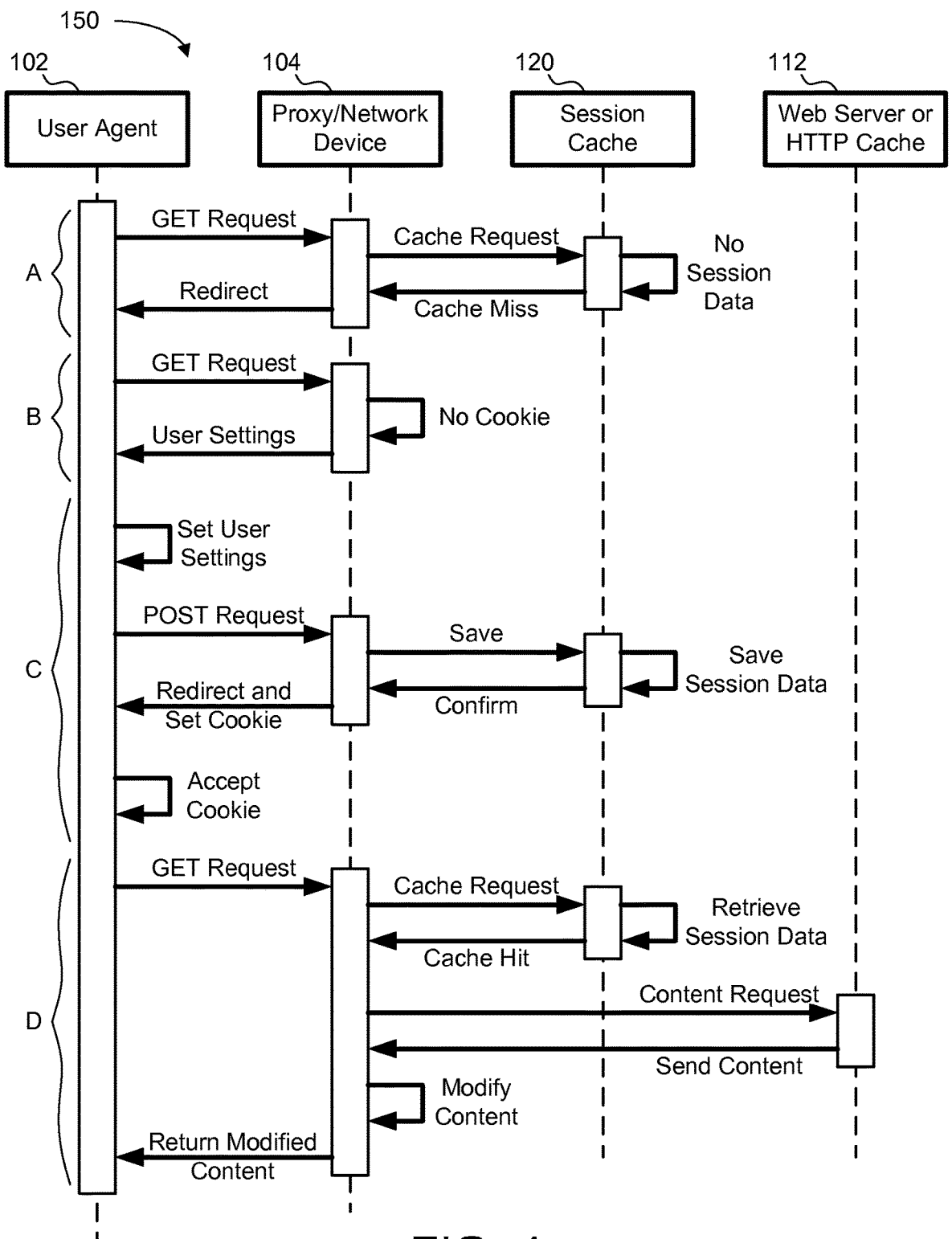
FIG. 4 depicts one embodiment of a method for setting up a user session and applying user preferences within the network system of FIG. 1.

FIG. 4 depicts one embodiment of a method 150 for setting up a user session and applying user preferences within the network system 100 of FIG. 1. For reference, the illustrated method 150 includes operations performed by the user agent 102, the intermediate network device 104 (also referred to as the proxy/network device), the session cache 120 (which may be at the intermediate network device 104), and a web service 112 (or equivalent web server or HTTP cache). Although the method 150 is described in conjunction with the network system 100 of FIG. 1, embodiments of the method 150 may be implemented with other types of network systems.

Also, for convenience, different operations shown in FIG. 4 correspond to several sub-groups of operations which are designated as A, B, C, and D. These designations are provided to correlate at least some of the operations shown in FIG. 4 with the same or similar operations shown in FIGS. 5 and 6. In particular, the embodiment shown in FIG. 5 includes some or all of the operations within the sub-group D. The embodiment shown in FIG. 6 includes some or all of the operations within the sub-groups A and D, as well as some of the operations within the sub-groups B and C. The designations of sub-groups of operations is not limiting as to the scope of the embodiments described herein.

In the method 150 of FIG. 4, the user agent 102 sends a GET request to the intermediate network device 104. The GET request includes an identifier for a particular web service 112. In some embodiments, this GET request may be initiated by actions from a user such as, for example, in response to an internet browser request. Alternatively, this GET request may be initiated autonomously by the user agent 102 such as, for example, in response to an automatic software update operation.

Upon receiving the GET request from the user agent 102, the intermediate network device 104 checks the session cache 120 to see if there is any existing session information (e.g., session settings 122) available. In this embodiment, there is no existing session information, so the intermediate network device 104 redirects the user agent 102 to the domain web service 106 (or another specified web service with similar functionality) to establish a network domain cookie 114z with applicable user preference information. In one example, a 302 redirect may be used to redirect the domain web service 106.

In response to the redirection, the user agent 102 issues a new GET request to the intermediate network device 104. This new GET request includes the network domain cookie 114z corresponding to the domain web service 106. In one embodiment, the originally requested URL may be stored in (or appended to) the query string of the redirected URL (e.g., separated by a "?"). In response, the user agent 102 receives instructions to provide user preference information. The user agent 102 facilitates user entry (or automated entry) of the requested user preference information, for example, via the user interface 118. In some embodiments, the user agent 102 facilitates entry of user preferences by a human user. In other embodiments, the user agent 102 facilitates automated or semi-automated entry of user preferences through interaction with a program application, rather than from a human user. In other embodiments, the user agent 102 also facilitates other types of automated and/or semi-automated interactions with one or more program applications at the user agent 102. The user agent 102 then sends a POST request to the intermediate network device 104, which stores the user preference information in the session settings 122, along with a session ID, in the session cache 120.

Upon confirming that the user preference information is stored in the session cache 120, the intermediate network device 104 redirects the user agent 102 back to the originally requested web service 112. Along with this redirection instruction, the intermediate network device 104 also sets a new cookie—the network domain cookie 114z—at the user agent 102. The user agent 102 may accept the network domain cookie 114z similar to any other cookie from any other web service 112. The user agent 102 may operate with no knowledge that the network domain cookie 114z includes user preference information that is also stored at the intermediate network device 104.

In response to being redirected back to the originally requested web service 112, the user agent 102 issues a new GET request to the intermediate network device 104. The intermediate network device 104 then retrieves the session settings 122 stored on the session cache 120 for the requesting user agent 102. The intermediate network device 104 also retrieves the requested content 126 from the requested web service 112. If there are any applicable parameters or instructions within the user preference information of the session settings 122, then the intermediate network device 104 may modify the retrieved content accordingly prior to sending the modified content to the user agent 102. The depicted method 150 then ends, although some or all of the described operations may be repeated or implemented again in response to a subsequent GET request.

Figure 5:
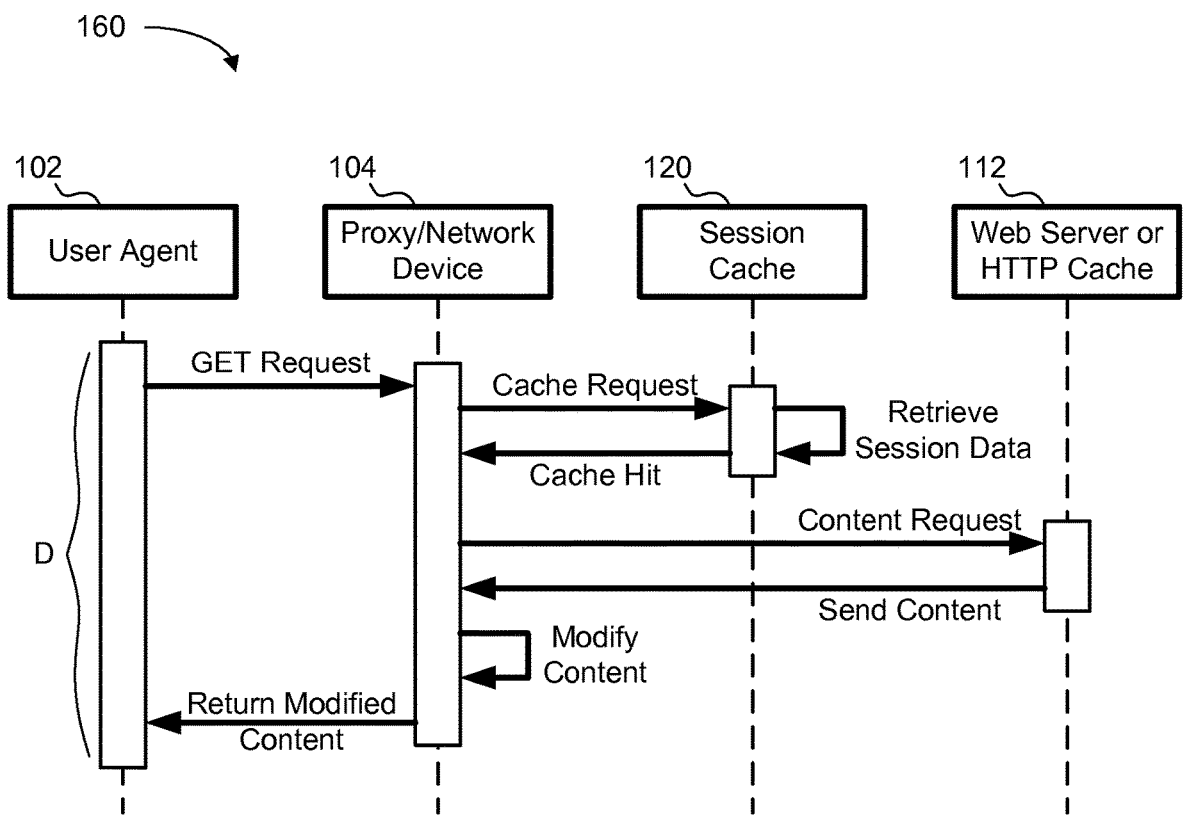
FIG. 5 depicts one embodiment of a method for applying user preferences during an existing user session within the network system of FIG. 1.

FIG. 5 depicts one embodiment of a method 160 for applying user preferences during an existing user session within the network system 100 of FIG. 1. For reference, the illustrated method 160 includes operations performed by the user agent 102, the intermediate network device 104, the session cache 120, and a web service 112 (or equivalent web server or HTTP cache). Although the method 160 is described in conjunction with the network system 100 of FIG. 1, embodiments of the method 160 may be implemented with other types of network systems.

The illustrated method 160 of FIG. 5 relates to a scenario in which the user agent 102 already has an ongoing HTTP session and the intermediate network device 104 already has the session settings 122 stored for the user agent 102. Consequently, the operations of sub-groups A, B, and C of FIG. 4 do not necessarily need to be re-executed. However, in some embodiments, some or all of the previously-described operations may be re-executed.

Since the intermediate network device 104 already stores the session settings 122, the user agent 102 does not need to provide the network domain cookie 114z, and the intermediate network device 104 does not need to store new session settings 122. As content 126 is retrieved from requested web services 112, the existing session settings 122 can be used to modify the retrieved content 126, accordingly, before it is sent to the user agent 102. The depicted method 160 then ends.

Figure 6:
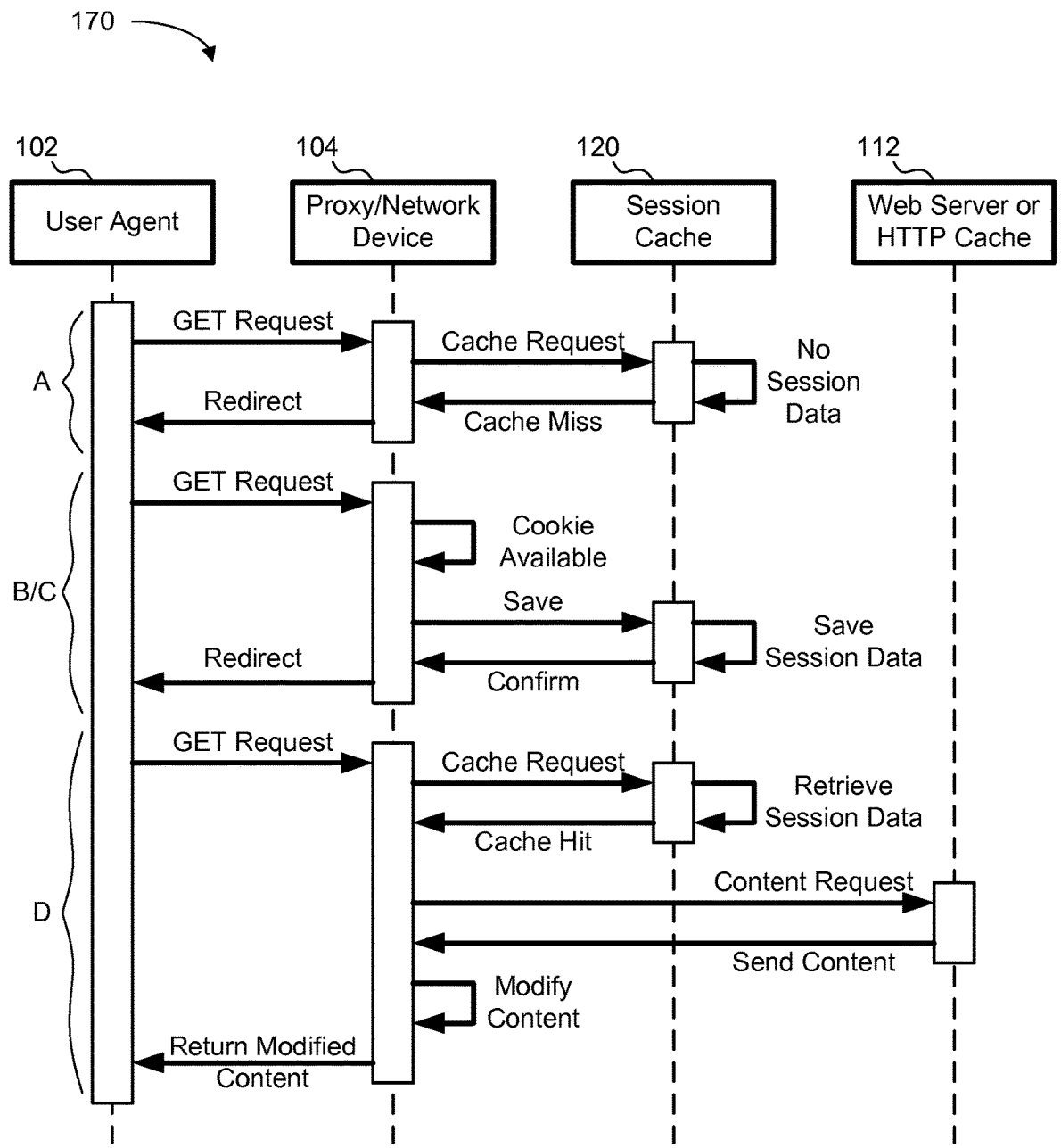
FIG. 6 depicts one embodiment of a method for re-establishing user preferences on the intermediate network device within the network system of FIG. 1.

FIG. 6 depicts one embodiment of a method 170 for re-establishing user preferences on the intermediate network device 104 within the network system 100 of FIG. 1. For reference, the illustrated method 170 includes operations performed by the user agent 102, the intermediate network device 104, the session cache 120, and a web service 112 (or equivalent web server or HTTP cache). Although the method 170 is described in conjunction with the network system 100 of FIG. 1, embodiments of the method 170 may be implemented with other types of network systems.

The illustrated method 170 of FIG. 6 relates to a scenario in which the user agent 102 already stores a network domain cookie 114z, but there is not an existing HTTP session established with the intermediate network device 104. Consequently, the operations of sub-group A are executed to determine if there is existing session data stored at the intermediate network device 102. The operations of sub-groups B and C are also partially executed, except that the network domain cookie 114z is initially sent from the user agent 102 to the intermediate network device 104 and does not have to be recreated.

Once the intermediate network device 104 stores the session settings 122 for the new session for the user agent 102, the intermediate network device 104 redirects the user agent 102 back to the originally requested web service 112, as described above. The depicted method 170 then ends.

Figure 7:
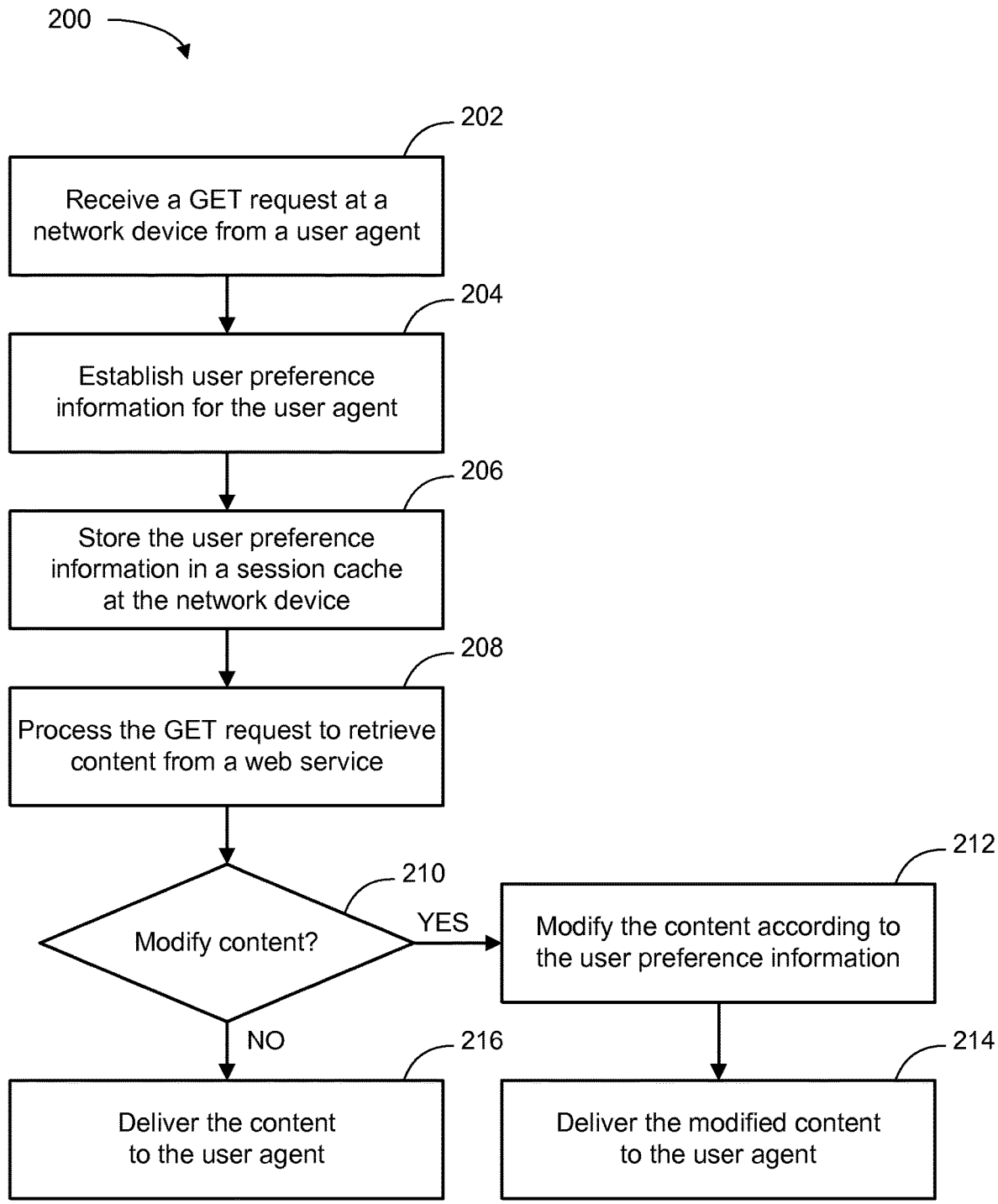
FIG. 7 depicts one embodiment of a method for retrieving web content in response to a user request.

FIG. 7 depicts one embodiment of a method 200 for retrieving web content in response to a user request. In contrast to the methods shown in FIGS. 4-6 and described above, the method 200 is specifically described from the perspective of the intermediate network device 104. Additionally, some of the steps shown in FIGS. 4-6 may be omitted in the method 200 of FIG. 7. Although the method 200 is described in conjunction with the intermediate network device 104 of FIG. 1, embodiments of the method 200 may be implemented with other types of intermediate network devices.

At block 202, the intermediate network device 104 receives the original GET request from the user agent 102. In one embodiment, the original GET request includes the network domain cookie 114z from the user agent 102, if the network domain cookie 114z is already stored on the user agent 102, as illustrated in FIG. 5 which is described above. In another embodiment, the network domain cookie 114z is received from the user agent 102 in a subsequent GET request, as illustrated in either FIG. 4 or FIG. 6, which are each described above. At block 204, the intermediate network device 104 establishes user preference information for the user agent 102. At block 206, the intermediate network device 104 stores the user preference information in the session cache 120 at or accessible to the intermediate network device 104. At block 208, the intermediate network device 104 processes the GET request to retrieve content 126 from a web service 112. Upon receiving the content 126 from the web service 112, the intermediate network device 104 determines at block 210 whether or not the content 126 might be modified according to the user preference information. If so, then at block 212 the intermediate network device 104 modifies the content according to the user preference information and, at block 214, delivers the modified content to the user agent 102. Otherwise, at block 216 the intermediate network device 104 may deliver the unmodified content 126 to the user agent 102. The depicted method 200 then ends.

Figure 8:
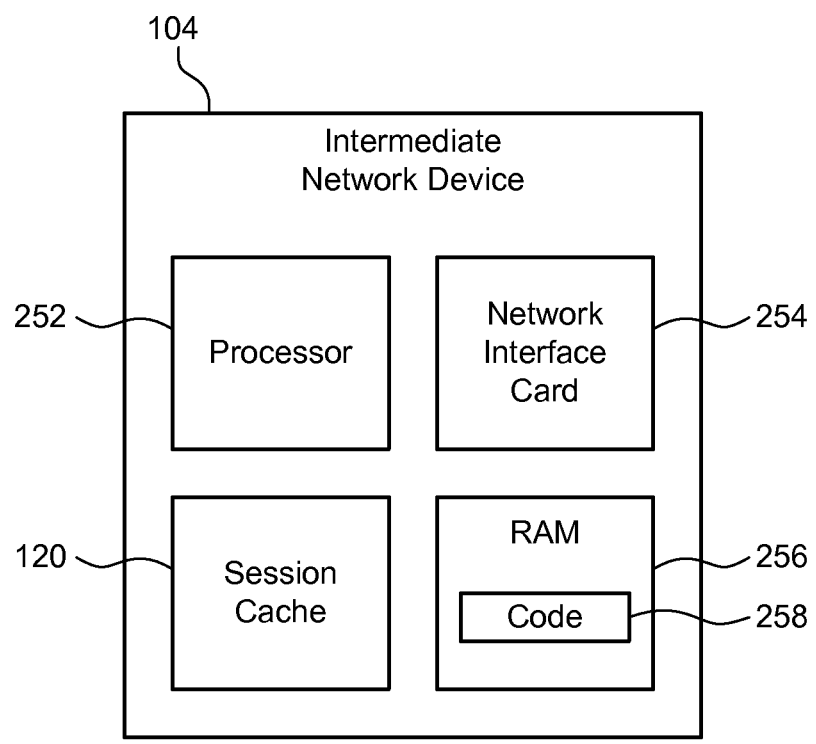
FIG. 8 depicts a schematic block diagram of one embodiment of the intermediate network device of FIG. 1.

FIG. 8 depicts a schematic block diagram of one embodiment of the intermediate network device 104 of FIG. 1. The illustrated device 104 includes a processor 252, a network interface card (NIC) 254, an electronic data memory device 256 (e.g., random access memory (RAM)), and the session cache 120. In one embodiment, the memory device 256 stores code 258 that may be stored and/or executed by the processor 252. The NIC 254 facilitates network communications (wired or wireless) with other networked devices.

Embodiments described herein include at least one processor 252 or processing unit coupled directly or indirectly to one or more memory elements 256 through a system bus (not shown) such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions (i.e., code) stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement may comprise an interaction gesture are included in the computer program product. In a further embodiment, operations are included in the computer program product for tabulating a quantity of one or more types of interaction with one or more content feeds displayed by the web page.

Embodiments of the application can take the form of an entirely hardware embodiment, an entirely software embodiment, or an embodiment containing both hardware and software elements. In one embodiment, the application is implemented in software, which includes but is not limited to firmware, resident software, microcode, etc.

Furthermore, embodiments of the application can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the application, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the disclosed embodiments are not intended to be limited to the specific forms or arrangements of parts so described and illustrated. The scope of the invention is to be defined by the claims appended hereto and their equivalents.

What is claimed is:

1. Network apparatus comprising: at least one processor and at least one memory including computer program code, the at least one memory and the computer program code being configured to, with the at least one processor, cause the network apparatus at least to:
receive a request, from a user device, for content stored at a content source;
determine whether user preference information is available to the network apparatus;
if user preference information is unavailable to the network apparatus, send to the user device a request for user preference information;

receive user preference information from the user device in response to the request for user preference information;

store the user preference information for use in at least a current user session of the user device;

send a request to the content source for the content requested by the user device;

receive the content from the content source;

send the content to the user device, wherein the content is in accordance with the user preference information;

send back to the user device the user preference information;

delete the user preference information after a period of inactivity; and subsequently;

retrieve from the user device the user preference information for use by the network apparatus in providing content from a content source to the user device in a subsequent user session of the user device, wherein the period of inactivity comprises a duration of a network session of the user device and a protection period following termination of the network session of the user device, wherein the protection period is shorter than a session identifier recycling period representative of a timeframe after which a session identifier for the user device is released and available for use for another user device.

2. The network apparatus of claim 1, the at least one memory and the computer program code being configured to, with the at least one processor, cause the network apparatus:

to determine whether the user preference information is available from a memory on a network side of a communications network.

3. The network apparatus of claim 2 wherein, if it is determined that user preference information is available from a memory on the network, the at least one memory and the computer program code being configured to, with the at least one processor, cause the network apparatus to:

send a request to the content source for the content requested by the user device;

receive the content from the content source;

send the content to the user device, wherein the content is in accordance with the user preference information.

4. The network apparatus of claim 1, the at least one memory and the computer program code being configured to, with the at least one processor, cause the network apparatus:

to determine whether the user preference information is retrievable from a memory on the user device.

5. The network apparatus of claim 1 wherein, the user preference information is in a cookie associated with a domain of the network apparatus.

6. The network apparatus of claim 1, the at least one memory and the computer program code being configured to, with the at least one processor, cause the network apparatus:

to determine whether a cookie, associated with a domain of the network apparatus, and which comprises the preference information is stored at the user device.

7. The network apparatus of claim 6, the at least one memory and the computer program code being configured to, with the at least one processor, cause the network apparatus:

to send a message to the user device prompting the user device to send a request addressed to the domain of the network apparatus, to receive the request addressed to the domain of the network apparatus; and to determine whether the request includes the cookie.

8. The network apparatus of claim 7, wherein;

if it is determined that the request includes the cookie, the at least one memory and the computer program code being configured to, with the at least one processor, cause the network apparatus to:

store the user preference information in the cookie at a store accessible by the network apparatus;

send a request to the content source for the content requested by the user device;

receive the content from the content source;

send the content to the user device, wherein the content is in accordance with the user preference information.

9. The network apparatus of claim 8, wherein, the request addressed to the domain of the network apparatus indicates an address of the content stored at the content source; the at least one memory and the computer program code being configured to, with the at least one processor, cause the network apparatus to:

obtain the address of the content stored at the content source from the request addressed to the domain of the network apparatus;

include the address of the content in a redirect message sent to the user device.

10. A method of operating a network apparatus, the method comprising;

receiving a request, from a user device, for content stored at a content source;

determining whether user preference information is available to the network apparatus;

if the user preference information is unavailable to the network apparatus, sending to the user device a request for user preference information;

receiving the user preference information from the user device in response to the request for user preference information;

storing the user preference information for use in at least a current user session of the user device;

sending a request to the content source for the content requested by the user device;

receiving the content from the content source;

sending the content to the user device, wherein the content is in accordance with the user preference information; and sending to the user device the user preference information;

deleting the user preference information after a period of inactivity; and subsequently:

retrieving from the user device the user preference information for use by the network apparatus in providing content from a content source to the user device in a subsequent user session of the user device, wherein the period of inactivity comprises a duration of a network session of the user device and a protection period following termination of the network session of the user device, wherein the protection period is shorter than a session identifier recycling period representative of a timeframe after which a session identifier for the user device is released and available for use for another user device.

11. The method of claim 10 wherein:

determining whether user preference information is available to the network apparatus comprises determining whether user preference information is available from a memory on the network side of a communications network.

12. The method of claim 10 wherein:
determining whether user preference information is available to the network apparatus comprises determining whether user preference information is retrievable from a memory on the user device.

13. The method of claim 12, wherein:
determining whether user preference information is retrievable from a memory on the user device comprises determining whether a cookie, associated with a domain of the network apparatus, and which comprises the user preference information is stored at the user device.

14. The method of claim 13, wherein;
determining whether the cookie is stored at the user device comprises sending a message to the user device prompting the user device to send a request addressed to the domain of the network apparatus,
receiving the request addressed to the domain of the network apparatus at the network apparatus; and
determining whether the request includes the cookie.

15. The method of claim 14, wherein;
if it is determined that the request includes the cookie:
    storing the user preference information indicated by the cookie at a store accessible by the network apparatus;
    causing a request to be sent to the content source for the media content requested by the user device;
    receiving the media content from the content network apparatus;
    sending the content to the user device, wherein the content is in accordance with the user preference information.

16. The method of claim 15, wherein, the request addressed to the domain of the network apparatus indicates an address of the content stored at a content source; the method further comprising:
    obtaining the address of the content stored at a content network apparatus from the request addressed to the domain of the network apparatus;
    including the address of the content in a redirect message sent to the user device.

17. The method of claim 10 wherein, the user preference information is in a cookie associated with a domain of the network apparatus.

18. A-non-transitory computer readable storage medium comprising a set of computer-readable instructions stored thereon, which, when executed by a processing system of a network apparatus cause the network apparatus to implement the steps of:
    receiving a request, from a user device, for content stored at a content source;
    determining whether user preference information is available to the network apparatus;
    if user preference information is unavailable to the network apparatus, sending to the user device a request for user preference information;
    receiving user preference information from the user device in response to the request for user preference information;
    storing the user preference information for use in at least a current user session of the user device;
    sending a request to be sent to the content source for the content requested by the user device;
    receiving the content from the content source;
    sending the content to the user device, wherein the content is in accordance with the user preference information; and
    sending to the user device the user preference information;
    deleting the user preference information after a period of inactivity; and
    subsequently;
    retrieving from the user device the user preference information for use by the network apparatus in providing content from a content source to the user device in a subsequent user session of the user device,
    wherein the period of inactivity comprises a duration of a network session of the user device and a protection period following termination of the network session of the user device, wherein the protection period is shorter than a session identifier recycling period representative of a timeframe after which a session identifier for the user device is released and available for use for another user device.

* * * * *